(12) United States Patent
Akahori

(10) Patent No.: US 7,970,180 B2
(45) Date of Patent: Jun. 28, 2011

(54) METHOD, APPARATUS, AND PROGRAM FOR PROCESSING RED EYES

(75) Inventor: Sadato Akahori, Kanagawa-ken (JP)

(73) Assignee: Fujifilm Corporation (JP)

( * ) Notice: Subject to any disclaimer, the term of this patent is extended or adjusted under 35 U.S.C. 154(b) by 1077 days.

(21) Appl. No.: 11/798,433

(22) Filed: May 14, 2007

(65) Prior Publication Data

US 2007/0263928 A1    Nov. 15, 2007

(30) Foreign Application Priority Data

May 15, 2006    (JP) .................................. 2006-134963

(51) Int. Cl.
  *G06K 9/00* (2006.01)
  *G06F 7/00* (2006.01)
(52) U.S. Cl. ......... 382/117; 382/118; 382/167; 707/705
(58) Field of Classification Search .................. 382/117, 382/167, 164, 165, 275, 103, 274, 118, 199, 382/173, 162, 190, 115; 348/239, 241; 396/191, 396/198; 426/72, 311, 620, 640, 641, 658; 707/705, 821–831
See application file for complete search history.

(56) References Cited

U.S. PATENT DOCUMENTS

| | | | |
|---|---|---|---|
| 6,252,976 B1 | 6/2001 | Schildkraut et al. | |
| 6,873,743 B2 * | 3/2005 | Steinberg | 382/275 |
| 7,024,035 B1 | 4/2006 | Enomoto | |
| 7,343,028 B2 * | 3/2008 | Ioffe et al. | 382/118 |
| 7,454,040 B2 * | 11/2008 | Luo et al. | 382/117 |
| 2006/0146062 A1 * | 7/2006 | Kee et al. | 345/582 |

FOREIGN PATENT DOCUMENTS

JP    2000-13680 A    1/2000

OTHER PUBLICATIONS

S. Lao et al., "Fast Omni-directional Face Detection", MIRU 2004, Jul. 2004 and a translation thereof.
W. Y. Zhao et al., "Face Recognition: A Literature Survey", UMD CfAR Technical Report CAR-TR-948, 2000.
H. Sakano, "Principal Component Analysis in Pattern Recognition—From the Viewpoint of Facial Image Recognition—", Proceedings of the Institute of Statistical Mathematics, vol. 49, No. 1, pp. 23-42, 2001 and a translation of the abstract.
K. Matsumoto et al., "Detection Method of Malignant Tumors in DR Images—Iris Filter", Journal of the Institute of Electronics, Information and Communication Engineers, vol. J-75-D11, No. 3, pp. 663-670, 1992 and a translation thereof.

* cited by examiner

*Primary Examiner* — Sheela C Chawan
(74) *Attorney, Agent, or Firm* — Studebaker & Brackett PC; Donald R. Studebaker

(57) ABSTRACT

During red eye processing, whether a facial image detected from within an entire image is that of a specific person registered in a database is judged. In the case that it is judged that the facial image is of the specific person registered in the database, red eye detection is performed within the facial image, employing red eye detecting parameters, which are also registered in the database.

12 Claims, 8 Drawing Sheets

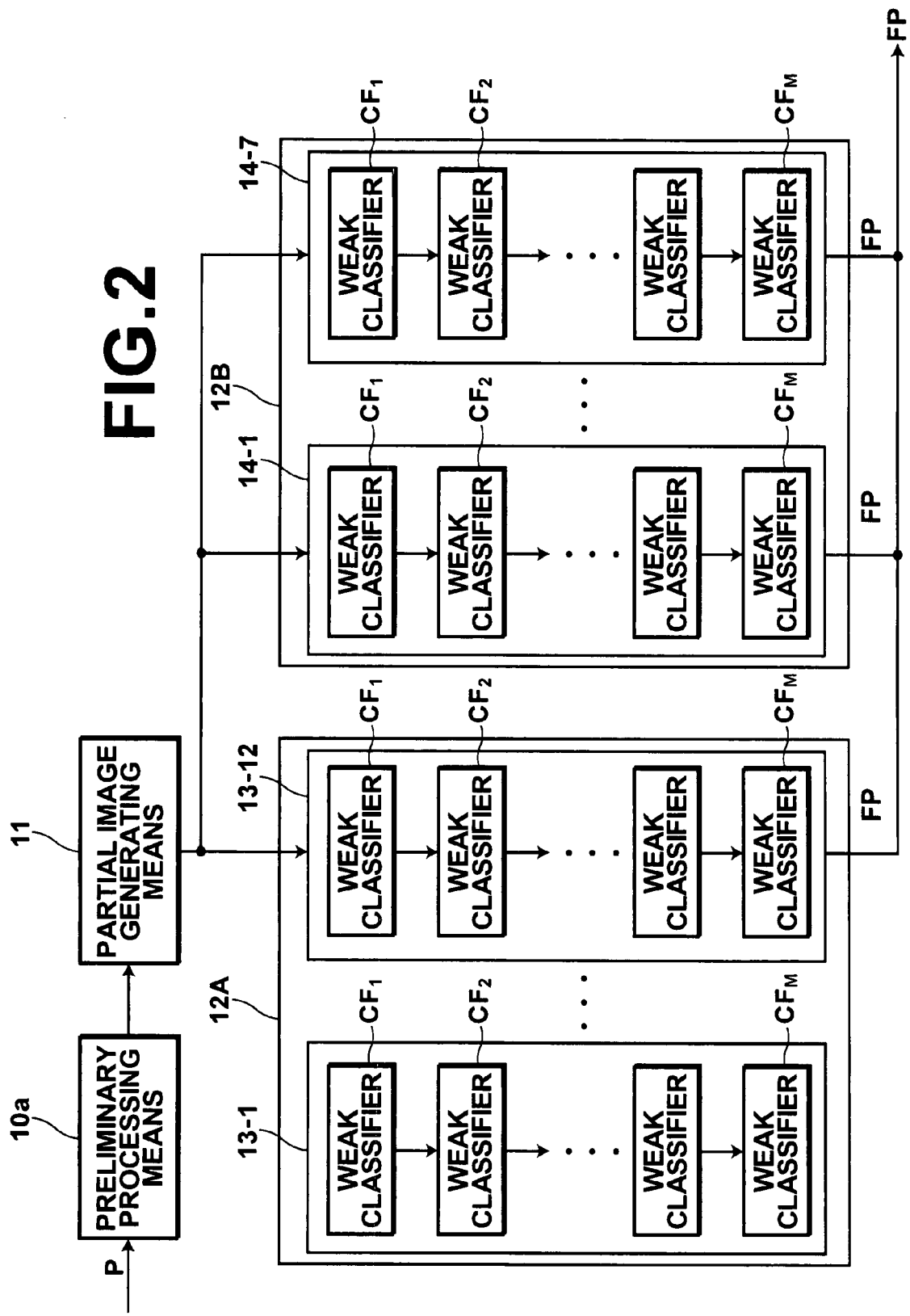

FORWARD FACING FACES

FACES IN PROFILE

| PEOPLE | RED EYE DETECTING PARAMETERS PM1 | RED EYE DETECTING PARAMETERS PM2 |
|---|---|---|
| PERSON 1 | THRESHOLD VALUE 1 | CORRECTION LEVEL 1 |
| PERSON 2 | THRESHOLD VALUE 2 | CORRECTION LEVEL 2 |
| ⋮ | ⋮ | ⋮ |

FIG.9
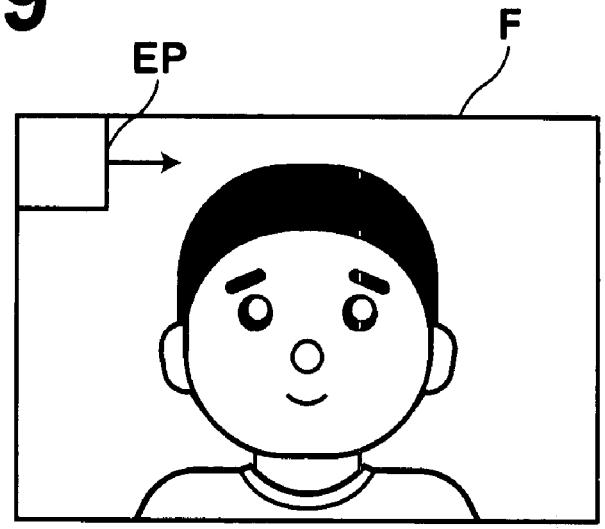
FIG.10A
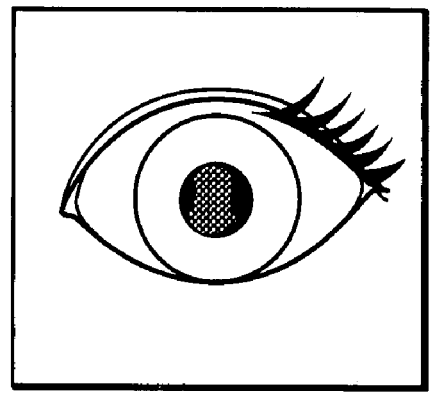
FIG.10B
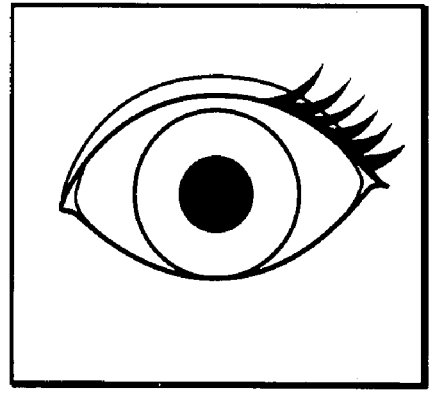

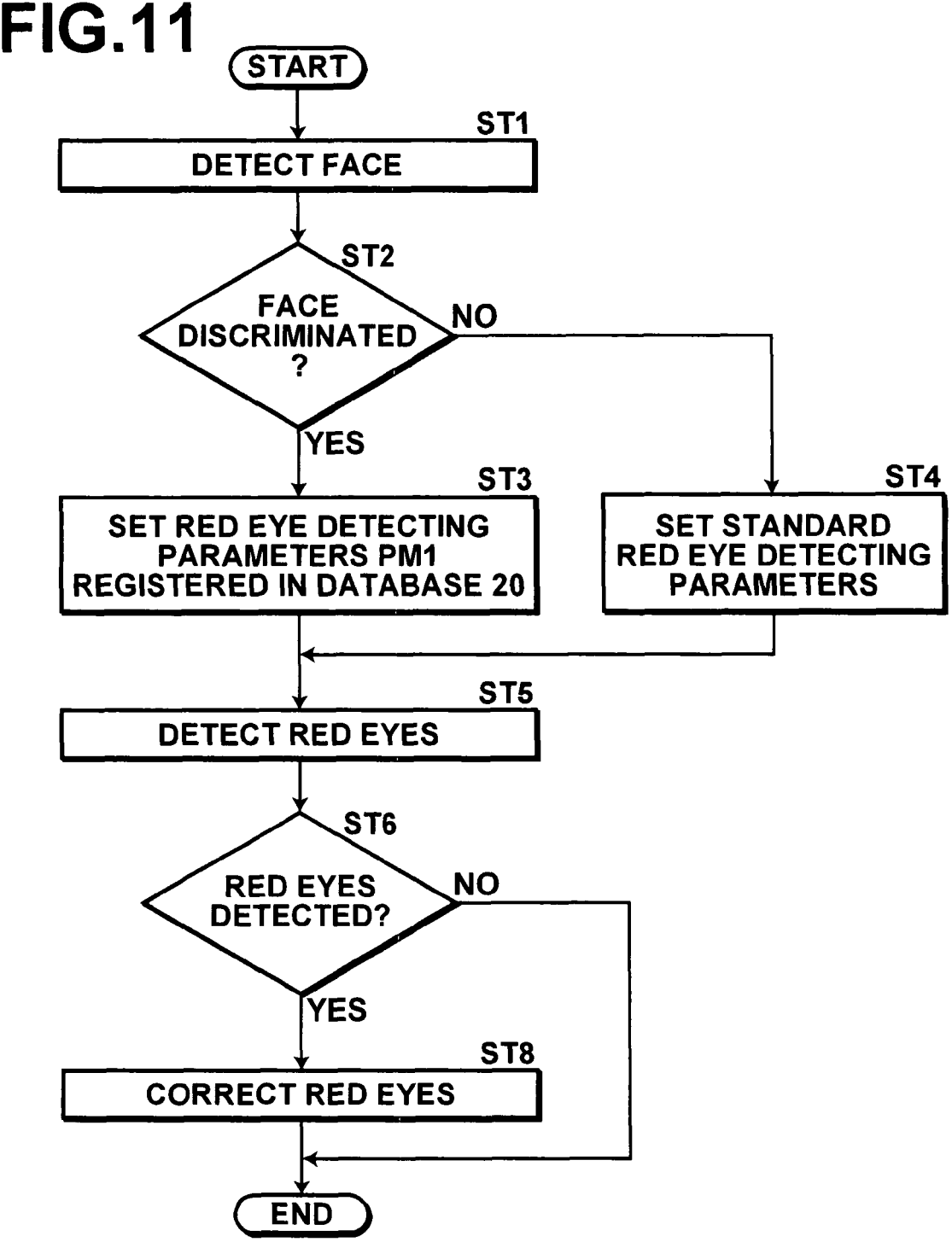

METHOD, APPARATUS, AND PROGRAM FOR PROCESSING RED EYES

BACKGROUND OF THE INVENTION

1. Field of the Invention

The present invention relates to a method, an apparatus, and a program for processing red eyes, that detects red eyes from within facial images included in entire images.

2. Description of the Related Art

There are cases in which pupils (or portions of pupils) of people or animals, photographed by flash photography at night or in dark places, are photographed as being red or gold. For this reason, various methods for correcting the color of pupils, which have been photographed as being red or gold (herein after, cases in which pupils are photographed as being gold are also referred to as "red eye"), to normal pupil colors by digital image processing have been proposed (for example, in Japanese Unexamined Patent Publication No. 2000-013680). Japanese Unexamined Patent Publication No. 2000-013680 discloses a method and apparatus for automatically discriminating red eyes. This method and apparatus automatically discriminate red eyes based on colors, positions, and sizes of pupils within regions specified by operators. In addition, a method has also been proposed wherein: predetermined characteristic amounts are calculated for each pixel within a region specified by an operator; and portions having characteristics that correspond to pupil portions are selected as targets of correction (for example, in U.S. Pat. No. 7,024,035).

Further, detecting faces, then detecting red eyes within regions which have been detected as faces, instead of performing red eye detection and red eye correction within regions specified by operators, has also been proposed (for example, in U.S. Pat. No. 6,252,976).

In the method disclosed in U.S. Pat. No. 6,252,976, red eye detection is performed using uniform set conditions with respect to all facial images within images. However, there are differences in the frequency of red eye occurrence and the degree of red colors within red eyes, among individuals. Therefore, there is a problem that detection accuracy deteriorates if red eye detection is uniformly administered with respect to all facial images. For example, in the case that red eyes are detected from within facial images of people for whom red eye occurs easily and from within facial images of people for whom red eye does not occur easily using the same detection properties, there is a possibility that red eyes will not be detected, even if they are present within the former facial images. Alternatively, false positive detections, in which red eyes are detected within the latter facial images even though they are not present, may occur.

SUMMARY OF THE INVENTION

The present invention has been developed in view of the foregoing circumstances. It is an object of the present invention to provide to provide a method, an apparatus, and a program for processing red eyes that improves detection accuracy with respect to red eyes, by taking individual differences in frequency of red eye occurrence and colors of red eyes into consideration.

A red eye processing method of the present invention comprises the steps of:

detecting a facial image from within an entire image;

discriminating whether the detected facial image is of a specific person who is registered in a database; and detecting red eyes from within the facial image employing red eye detecting parameters which are correlated to the specific person and registered in the database, if it is discriminated that the detected facial image is that of the specific person.

A red eye processing apparatus of the present invention comprises:

face detecting means, for detecting a facial image from within an entire image;

a database, in which specific people and red eye detecting parameters that determine detection properties during detection of red eyes from eyes of each of the specific people are correlated and registered;

discriminating means, for discriminating whether the detected facial image is of a specific person who is registered in the database; and red eye detecting means, for detecting red eyes from within the facial image employing the red eye detecting parameters which are correlated to the specific person and registered in the database, if it is discriminated that the detected facial image is that of the specific person.

A red eye processing program of the present invention causes a computer to execute the procedures of:

detecting a facial image from within an entire image;

discriminating whether the detected facial image is of a specific person who is registered in a database; and detecting red eyes from within the facial image employing red eye detecting parameters which are correlated to the specific person and registered in the database, if it is discriminated that the detected facial image is that of the specific person.

Here, the "red eye detecting parameters" determine detection rates and false positive detection rates during detection of red eyes, which are detection properties. The detection properties are changed by varying the red eye detecting parameters. Note that "detection rates" are percentages of correct judgments of red eyes as being red eyes, and that "false positive detection rates" are percentages of false positive detections, in which objects other than red eyes are judged to be red eyes.

Note that the redeye detecting means may employ any method to detect red eyes. For example, the red eye detecting means may comprise: region setting means, for setting discrimination target regions of a set number of pixels within the facial image; and a plurality of red eye classifiers, for extracting features from the discrimination target regions set by the region setting means, and for detecting red eyes by comparing the features against the red eye detecting parameters. In this case, red eyes can be detected, by employing a plurality of discrimination results of the plurality of red eye classifiers.

The red eye processing apparatus may also further comprise: red eye correcting means, for correcting red eyes if red eyes are detected by the red eye detecting means. In this case, red eye correcting parameters that determine the degree of correction by the red eye correcting means may be correlated with each of the specific people and registered in the database, and the red eye correcting means may perform red eye correction with respect to the facial image according to the contents of the red eye correcting parameters correlated with a specific person, if it is discriminated that the detected facial image is that of the specific person.

Further, the face detecting means may comprise: partial image generating means, for generating a plurality of partial images by scanning a subwindow, which is a frame surrounding a set number of pixels; and face classifiers, for discriminating whether the partial images generated by the partial image generating means are faces. In this case, the face classifiers may perform final discrimination regarding whether the plurality of partial images represent faces, employing discrimination results of a plurality of weak classifiers.

According to the method, apparatus, and program for processing red eyes of the present invention, whether a detected facial image is of a specific person who is registered in a database is discriminated; and red eyes are detected from within the facial image employing red eye detecting parameters which are correlated to the specific person and registered in the database, if it is discriminated that the detected facial image is that of the specific person. Therefore, red eye detection properties can be set for each facial image, to correspond to differences among people, for whom red eye occurs easily, and for whom red eye does not occur easily. Accordingly, the accuracy of red eye detection can be improved.

Note that the red eye detecting means may comprise: region setting means, for setting discrimination target regions of a set number of pixels within the facial image; and a plurality of red eye classifiers, for extracting features from the discrimination target regions set by the region setting means, and for detecting red eyes by comparing the features against the red eye detecting parameters. In this case, red eyes can be detected, by employing a plurality of discrimination results of the plurality of red eye classifiers. Thereby, red eyes can be accurately detected.

The red eye processing apparatus may also further comprise: red eye correcting means, for correcting red eyes if red eyes are detected by the red eye detecting means. In this case, red eye correcting parameters that determine the degree of correction by the red eye correcting means may be correlated with each of the specific people and registered in the database, and the red eye correcting means may perform red eye correction with respect to the facial image according to the contents of the red eye correcting parameters correlated with a specific person, if it is discriminated that the detected facial image is that of the specific person. Thereby, deterioration in image quality, which may occur when red eye correction is performed to a great degree during correction of red eyes in a facial image of a person for whom red eye does not occur easily, can be prevented.

Further, the face detecting means may comprise: partial image generating means, for generating a plurality of partial images by scanning a subwindow, which is a frame surrounding a set number of pixels; and face classifiers, for discriminating whether the partial images generated by the partial image generating means are faces. In this case, the face classifiers may perform final discrimination regarding whether the plurality of partial images represent faces, employing discrimination results of a plurality of weak classifiers. Thereby, faces can be detected accurately and efficiently.

BRIEF DESCRIPTION OF THE DRAWINGS

FIG. 2 is a block diagram that illustrates an example of a face detecting means of the red eye processing apparatus of FIG. 1.

FIG. 9 is a diagram that illustrates the manner in which judgment target regions are set by the red eye detecting means of FIG. 8.

FIGS. 10A and 10B are diagrams that illustrate the manner in which red eyes are corrected by a red eye correcting means of FIG. 1.

FIG. 11 is a flow chart that illustrates the steps of a preferred embodiment of the red eye correcting process of the preset invention.

DESCRIPTION OF THE PREFERRED EMBODIMENTS

Figure 1:
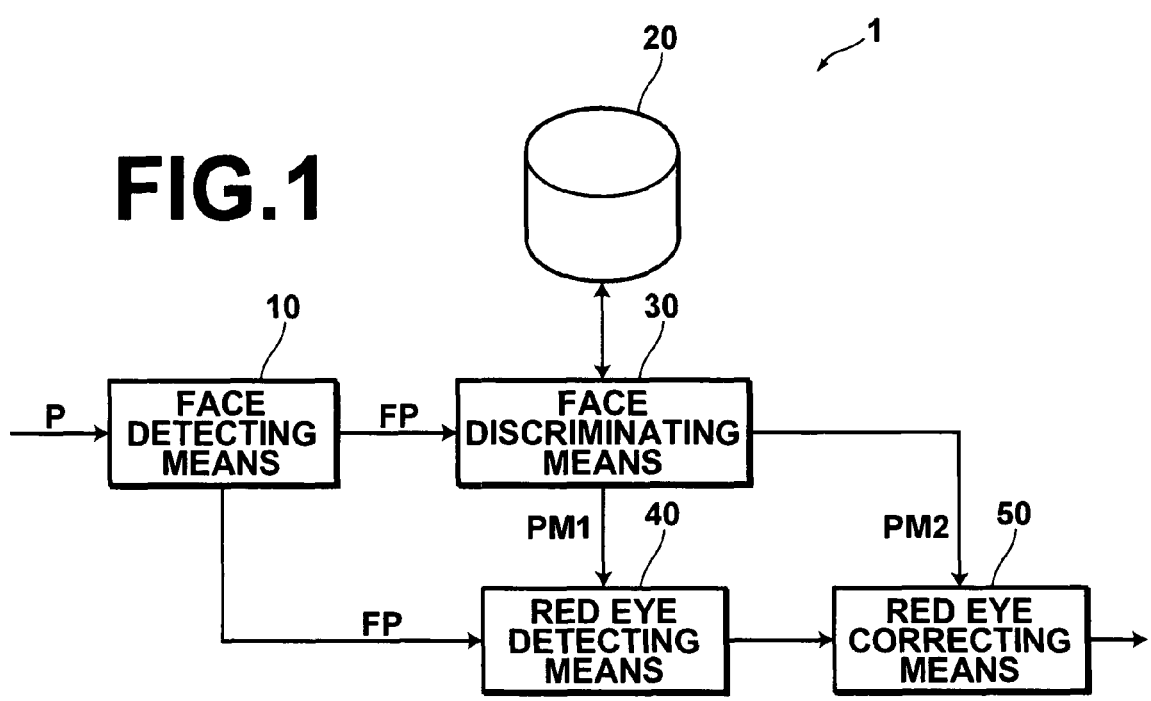
FIG. 1 is a block diagram that illustrates the configuration of a red eye processing apparatus according to an embodiment of the present invention.

Herein after, an embodiment of the red eye processing apparatus of the present invention will be described in detail with reference to the attached drawings. FIG. 1 is a block diagram that illustrates the configuration of a red eye processing apparatus 1 according to a first embodiment of the present invention. Note that the configuration of the red eye processing apparatus 1 is realized by executing a red eye processing program, which is read into an auxiliary memory device, on a computer (a personal computer, for example). The red eye processing program is recorded in a data medium such as a CD-ROM, or distributed via a network such as the Internet, and installed in the computer.

The red eye processing apparatus 1 comprises: a face detecting means 10, for detecting faces included in entire images P; a database 20, in which specific people and red eye detecting parameters PM1 are correlated and registered; a face discriminating means 30, for discriminating whether facial images F detected by the face detecting means 10 are of the specific people registered in the database 20; and a red eye detecting means 40, for performing red eye detection employing the red eye detecting parameters PM1 correlated to a specific person in the database 20, if the facial images F are discriminated to be of the specific person.

As illustrated in FIG. 2, the face detecting means 10 comprises: a partial image generating means 11, for generating partial images PP by scanning a subwindow W on the entire images P; a forward facing face detecting means 12A, for detecting partial images that represent forward facing faces from among the plurality of partial images PP generated by the partial image generating means 11; and a profile face detecting means 12A, for detecting partial images that represent faces in profile from among the plurality of partial images PP generated by the partial image generating means 11.

Note that preliminary processes are administered on the entire images P by a preliminary processing means 10a, prior to the entire images P being input to the partial image generating means 11. The preliminary processing means 10a generates a plurality of entire images P2, P3, and P4 having different resolutions from the entire images P, as illustrated in FIGS. 3A through 3D. Further, the preliminary processing means 10a administers a normalizing process (herein after, referred to as a "local normalizing process") that suppresses fluctuations in contrast within local regions of the plurality of entire images P, P2, P3, and P4, across the entireties of the entire images P, P2, P3, and P4.

Figure 3A:
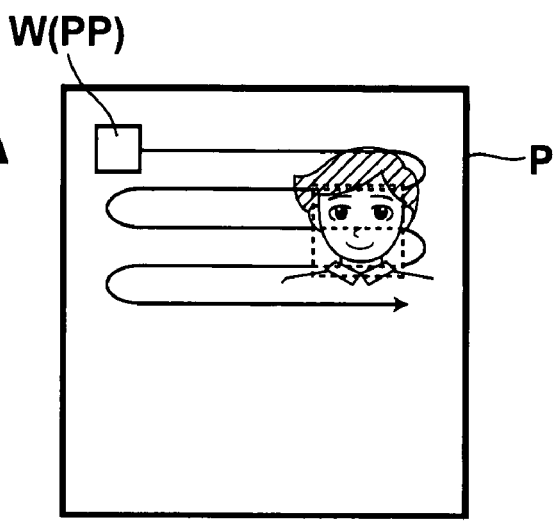
FIGS. 3A, 3B, 3C, and 3D are diagrams that illustrate the manner in which subwindows are scanned by a partial image generating means of the face detecting means illustrated in FIG. 2.

As illustrated in FIG. 3A, the partial image generating means 11 scans the subwindow W having a set number of pixels (32 pixels by 32 pixels, for example) within the entire images P, and cuts out regions surrounded by the subwindow W to generate the partial images PP having a set number of pixels. The partial image generating means 11 generates the partial images PP by scanning the subwindow W within the entire images P while skipping over a predetermined number of pixels.

Figure 3B:
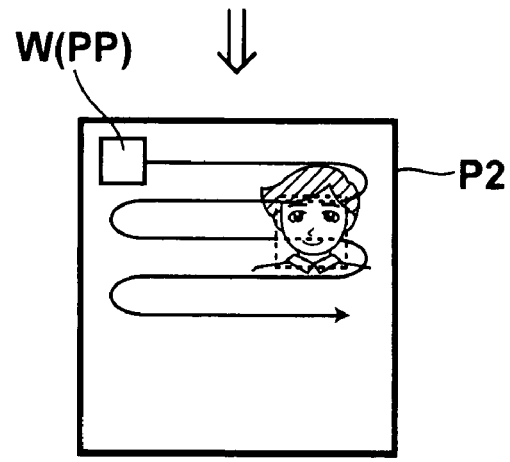
Figure 3C:
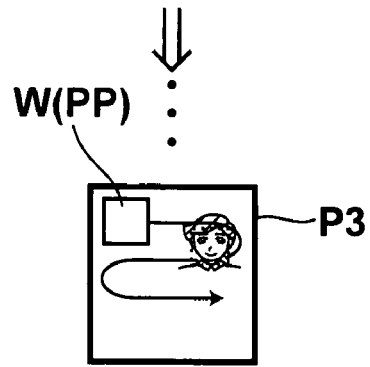
Figure 3D:
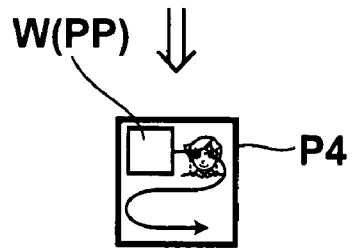

Note that the partial image generating means 11 also generates partial images PP by scanning the subwindow W within the generated lower resolution images as well, as illustrated in FIGS. 3B through 3D. Thereby, even in the case that faces (discrimination target) pictured in the entire images P do not fit within the subwindow W, it becomes possible to fit the faces within the subwindow W in the lower resolution images. Accordingly, faces can be positively detected.

Figure 4A:
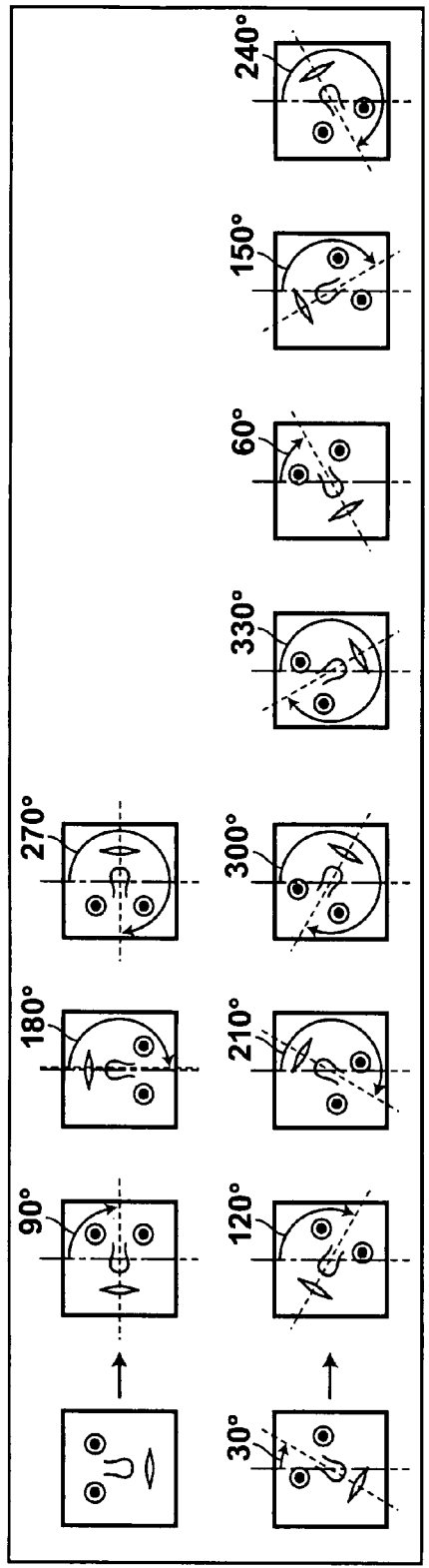
FIGS. 4A and 4B are diagrams that illustrate examples of forward facing faces and faces in profile, which are detected by the face detecting means of FIG. 2.
Figure 4B:
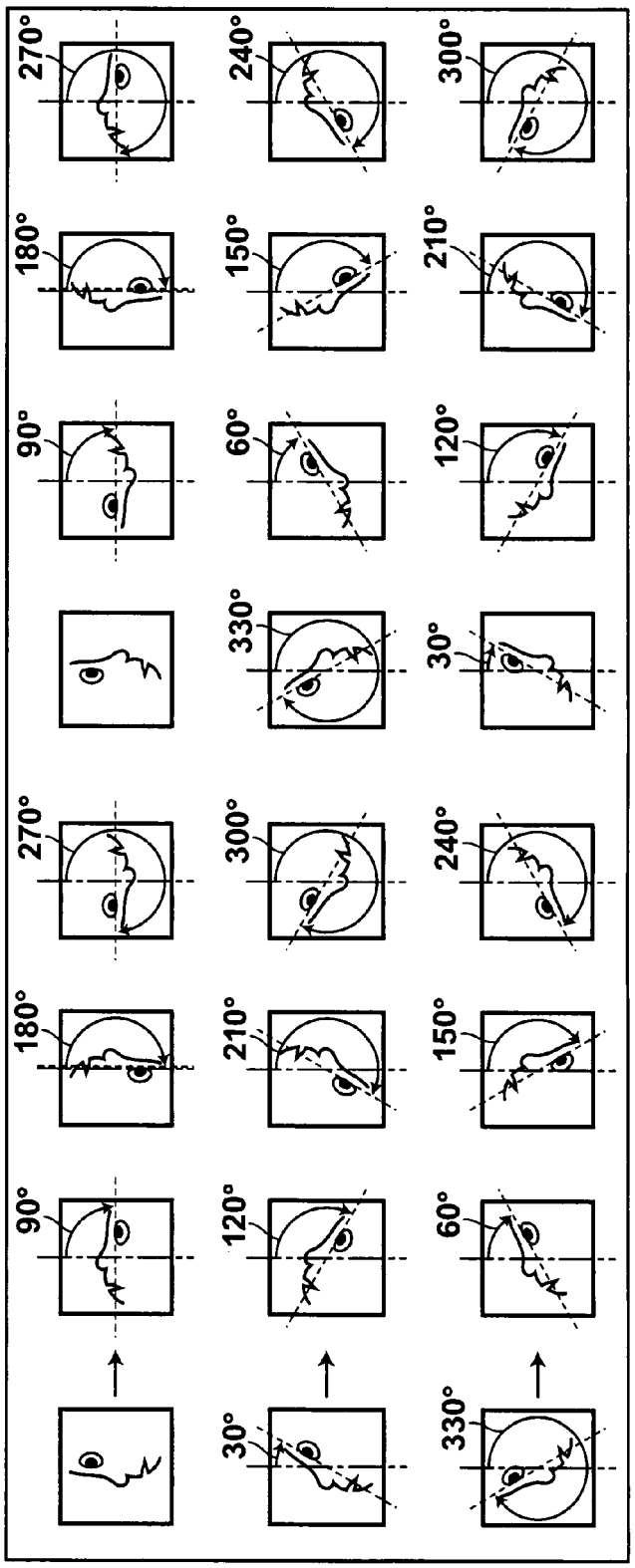

The forward facing face detecting means 12A and the profile face classifier detect facial images F employing the Adaboosting algorithm, for example. The forward facing face detecting means 12A functions to detect faces that face forward and are rotated within the plane of the entire images P (refer to FIG. 4A), and comprises twelve forward facing face classifiers 13-1 through 13-12, which span a range of 30° to 330° in 30° intervals. Note that each of the forward facing face classifiers 13-1 through 13-12 are capable of detecting faces within a rotation al angular range of −15° to +15°, with 0° as the center of rotation. The profile face detecting means 12B functions to detect faces in profile which are rotated within the plane of the entire images P (refer to FIG. 4B), and comprises seven profile face classifiers 14-1 through 14-7, which span a range of −90° to +90° in 30° intervals. Note that the profile face detecting means 12B may further comprise profile face classifiers for detecting images in which the directions that faces are facing are rotated outside the plane of the entire images P.

The forward facing face classifiers 13-1 through 13-12 and the profile face classifiers 14-1 through 14-7 function to perform binary discrimination regarding whether the partial images PP represent faces, and comprise a plurality of weak classifiers $CF_1$ through $CF_M$ (M is the number of weak classifiers).

Each of the weak classifiers $CF_1$ through $CF_M$ extracts features x from the partial images PP, and discriminates whether the partial images PP represent faces employing the features x. Each face classifier performs final judgment regarding whether the partial images PP represent faces, employing the discrimination results of the weak classifiers $CF_1$ through $CF_M$.

Figure 5:
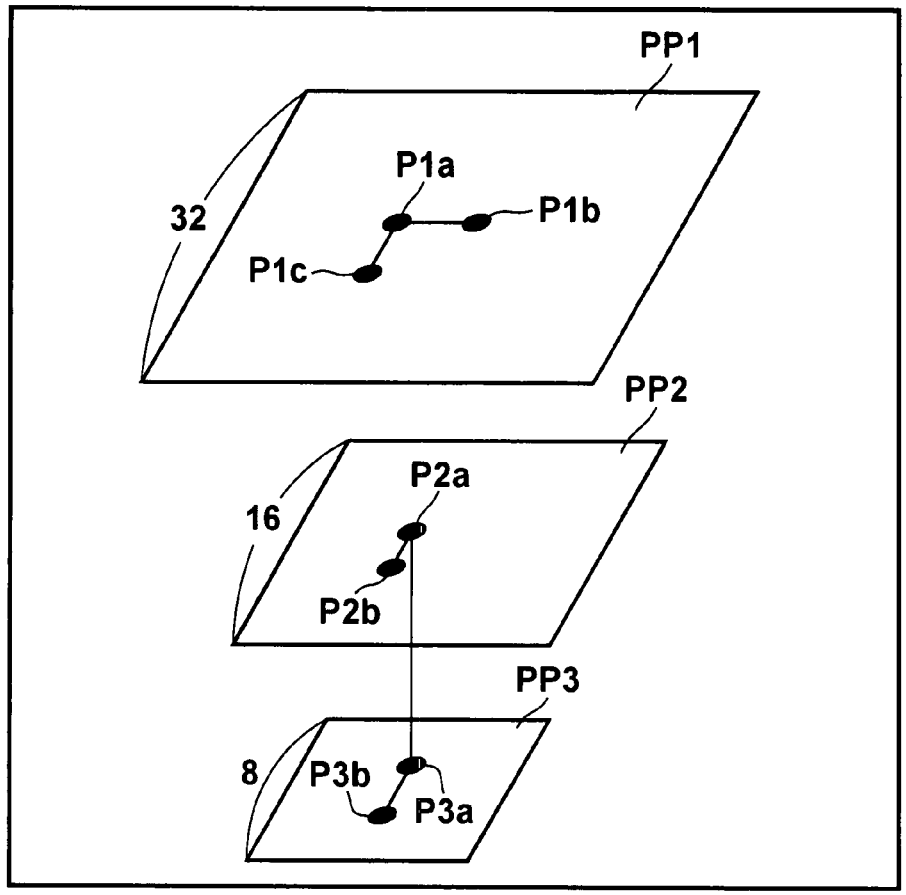
FIG. 5 is a diagram that illustrates the manner in which features are extracted from partial images, by weak classifiers of FIG. 1.

Specifically, each of the weak classifiers $CF_1$ through $CF_M$ extracts brightness values or the like of coordinate positions P1a, P1b, and P1c within the partial images PP, as illustrated in FIG. 5. Further, brightness values of coordinate positions P2a, P2b, P3a, and P3b are extracted from lower resolution images PP2 and PP3 of the partial images PP, respectively. Thereafter, the seven coordinate positions P1a through P3b are combined as pairs, and the differences in brightness values of each of the pairs are designated to be the features x. Each of the weak classifiers $CF_1$ through $CF_M$ employs different features. For example, the weak classifier $CF_1$ employs the difference in brightness values between coordinate positions P1a and P1c as the feature x, while the weak classifier $CF_2$ employs the difference in brightness values between coordinate positions P2a and P2b as the feature x.

Note that a case has been described in which each of the weak classifiers $CF_1$ through $CF_M$ extracts features x. Alternatively, the features x may be extracted in advance for a plurality of partial images PP, then input into each of the weak classifiers $CF_1$ through $CF_M$. Further, a case has been described in which brightness values are employed to calculate the features x. Alternatively, data, such as that which represents contrast or edges, may be employed to calculate the features x.

Figure 6:
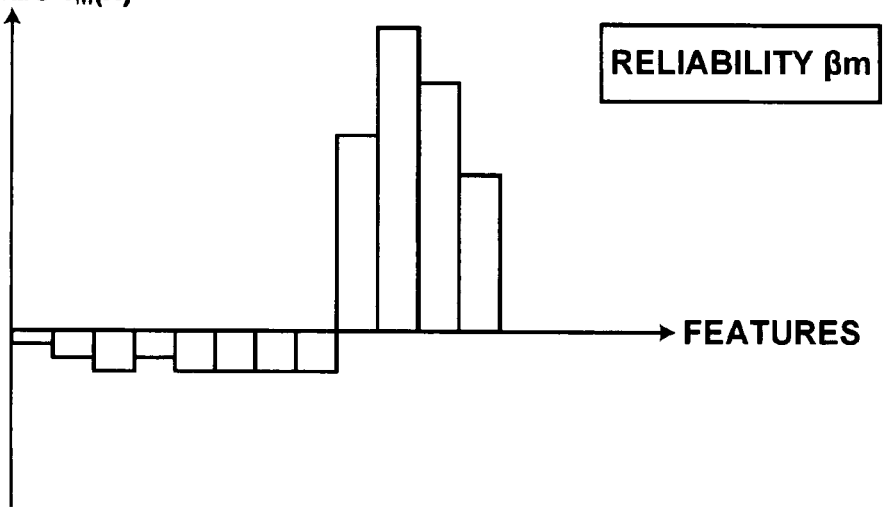
FIG. 6 is a graph that illustrates an example of a histogram of the weak classifiers of FIG. 1.

Each of the weak classifiers $CF_1$ through $CF_M$ has a histogram such as that illustrated in FIG. 6. The weak classifiers $CF_1$ through $CF_M$ output scores f1(x) through fM(x) according to the values of the features x based on these histograms. Further, the weak classifiers $CF_1$ through $CF_M$ have confidence values $\beta_1$ through $\beta_M$ that represent the levels of discrimination performance thereof. The weak classifiers $CF_1$ through $CF_M$ calculate discrimination scores $\beta_M \cdot f_M(x)$ by multiplying the scores f1(x) through $f_M(x)$ by the confidence values $\beta_1$ through $\beta_M$. Whether the discrimination score $\beta_M \cdot f_M(x)$ of each weak classifier $CF_m$ is greater than or equal to a threshold value Sref is judged. A partial image PP is judged to represent a face when the discrimination score $\beta_M \cdot f_M(x)$ is equal to or greater than the threshold value Sref ($\beta_M \cdot f_M(x) \geqq $ Sref).

The weak classifiers $CF_1$ through $CF_M$ are configured in a cascade structure, and only partial images PP which have been judged to represent faces by all of the weak classifiers $CF_1$ through $CF_M$ are output as candidate images CP. That is, discrimination is performed by a downstream weak classifier $CF_{m+1}$ only on partial images in which faces have been discriminated by the weak classifier $CF_m$. Partial images PP in which faces have not been discriminated by the weak classifier $CF_m$ are not subjected to discrimination operations by the downstream weak classifier $CF_{m+1}$. The number of partial images PP to be discriminated by the downstream weak classifiers can be reduced by this structure, and accordingly, the discrimination operations can be accelerated. Note that the details of classifiers having cascade structures are disclosed in S. Lao et al., "Fast Omni-direction al Face Detection", *MIRU* 2004, July, 2004.

Note that each of the classifiers 13-1 through 13-12 and 14-1 through 14-7 comprise weak classifiers which have performed learning using sample images of forward facing faces or faces in profile, at predetermined angles of in-plane rotation corresponding thereto. In the case described above, each of the discrimination scores $\beta_M \cdot f_M(x)$ are individually compared against the threshold value Sref to judge whether a partial image PP represents a face. Alternatively, discrimination may be performed by comparing the sum $\Sigma_{r=1}^{m} \beta r \cdot f_r(X)$ of the discrimination scores of upstream weak classifiers $CF_1$ through $CF_{m-1}$ against a predetermined threshold value S1ref ($\Sigma_{r=1}^{m} \beta_r \cdot f_r(x) \geqq $ S1ref). The discrimination accuracy can be improved by this method, because judgment can be performed while taking the discrimination scores of upstream weak classifiers into consideration. Further, a case has been described in which the face detecting means 10 detects faces employing the AdaBoosting algorithm. Alternatively, faces may be detected employing the known SVM (Support Vector Machine) algorithm.

Figure 7:
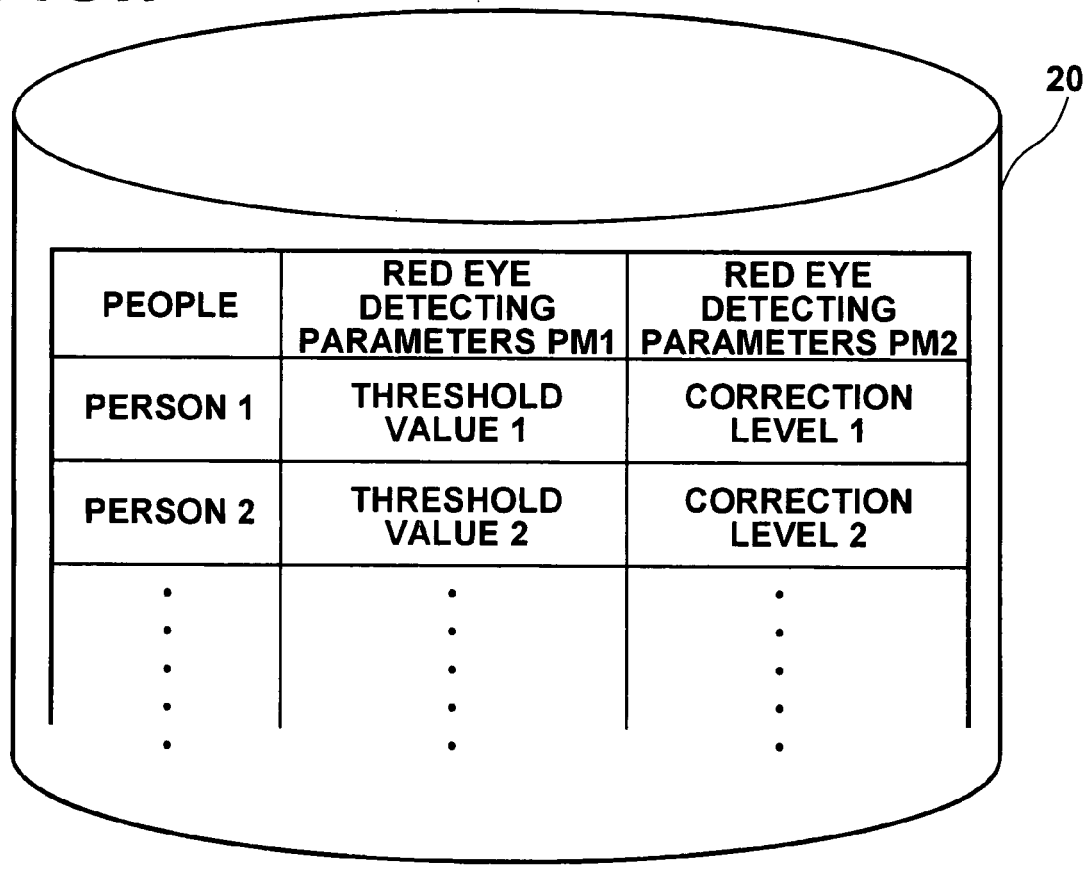
FIG. 7 is a diagram that illustrates an example of a database of FIG. 1.

As illustrated in FIG. 7, data regarding specific people, such as a photographer and their acquaintances, are registered in the database 20, correlated with the red eye detecting parameters PM1 that determine the detection properties of the red eye detecting means 40. Here, for example, red eye detecting parameters PM1 that increase the detection rates of each of the red eye classifiers are registered, correlated with people for whom red eye occurs easily. On the other hand, red eye detecting parameters PM1 that decrease the false positive detection rates of each of the red eye classifiers are registered, correlated with people for whom red eye does not occur easily.

The discriminating means 30 discriminates whether the facial images F detected by the face detecting means 10 are those of people who are registered in the database 20. Here, various known methods may be employed to discriminate faces. For example, faces may be discriminated by: a method that employs local features within the facial images; a method that employs the Adaboost algorithm; a graph matching method; or a template matching method. Details of these methods are disclosed in: W. Y. Zhao et al., "Face Recognition: A Literature Survey", UMD CfAR Technical Report CAR-TR-948, 2000; L. Shihong, O. Yamaguchi, T. Hirayama, "Face Detection and Face Recognition by Image Processing", 149$^{th}$ CVIM Meeting, May 2005; and H. Sakano, "Principal Component Analysis in Pattern Recognition—From the Viewpoint of Facial Image Recognition-", *Proceedings of the Institute of Statistical Mathematics*, vol. 49, No. 1, pp. 23-42, 2001. Note that data that enables discrimination that facial images are those of the specific people by each of the above algorithms (such as local features within facial images and the facial images F themselves) are registered as the data regarding the specific people in the database 20.

Figure 8:
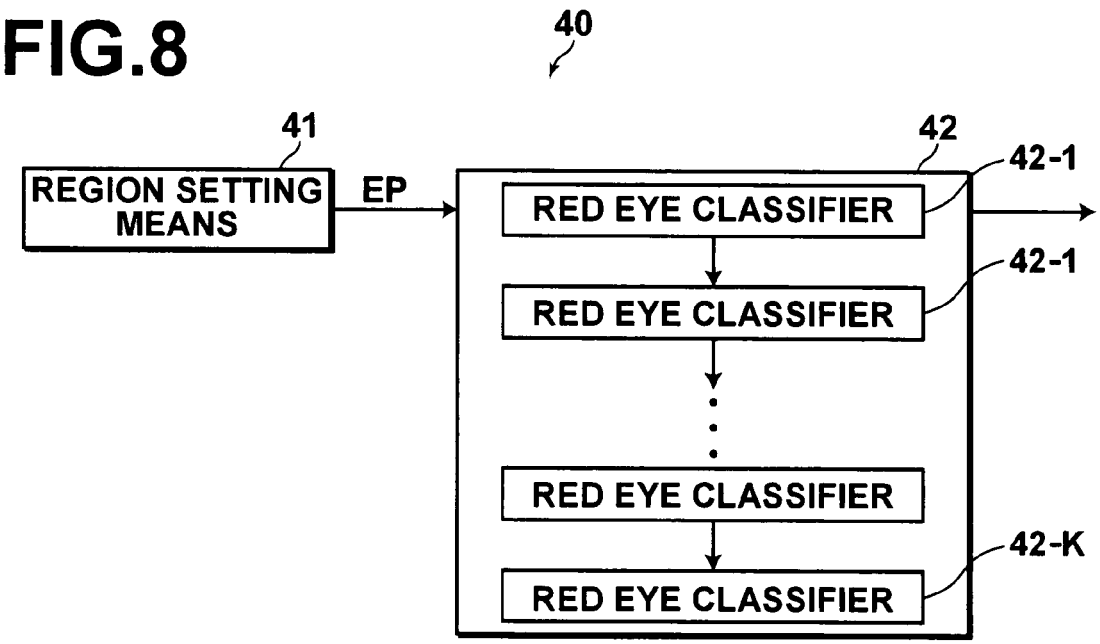
FIG. 8 is a block diagram that illustrates the configuration of a red eye detecting means illustrated in FIG. 1.

The red eye detecting means 40 detects red eyes from within the facial images F, and judges whether eyes are red eyes, based on features of the pupils, for example. Specifically, as illustrated in FIG. 8, the red eye detecting means 40 comprises: a region setting means 41, for setting judgment target regions (10×10 pixel regions, for example) within the facial images F; and a plurality of red eye classifiers 42-1 through 42-K (K is the number of red eye classifiers), for judging whether the judgment target regions set by the region setting means 41 represent red eyes. The region setting means 41 sets, for example, 10×10 pixel judgment target regions EP within a facial image F, as illustrated in FIG. 9. The judgment target regions EP are set while scanning the entirety of the facial image F.

Each of the red eye classifiers 42-1 through 42-K detect red eyes, by judging whether images within the set judgment target regions EP have characteristics of red eyes therein. Specifically, each of the red eye classifiers 42-1 through 42-K calculate features from within the judgment target regions EP, and judges whether the images therein represent red eyes by comparing the calculated features against the red eye detecting parameters PM1. For example, the red eye classifier 42-1 calculates discrimination scores from pixel values within the judgment target regions EP. The discrimination scores become greater when the pixel values are those that represent red, smaller when the pixel values are those that represent brown, and zero or negative when the pixel values are those that represent colors which are clearly not red (such as yellow). The red eye classifier 42-1 totals the discrimination scores for all of the pixels within each of the discrimination target regions EP, and outputs the total as the feature thereof.

Meanwhile, a threshold value (standard red eye detecting parameter) is set in the red eye classifier 42-1. Whether a judgment target region EP represents a red eye is judged by comparing the standard red eye detecting parameter against the feature thereof. If the feature of a judgment target region EP is greater than or equal to the set threshold value (standard red eye detecting parameter), the judgment target region EP is judged to represent a red eye. If the feature of a judgment target region EP is less than the set threshold value, the judgment target region EP is judged to not represent a red eye.

The red eye classifier 42-1 calculates features based on pixel values, as described above. The other red eye classifiers 42-2 through 42-K calculate features based on: differences between pixel values of pixels (x, y) and (x+dx, y+dy); pairs of a difference v1, between pixel values of pixels (x, y) and (x+dx1, y+dy1), and a difference v2, between pixel values of pixels (x, y) and (x+dx2, y+dy2); combinations of differences of pixel values of four or more points, and the like. K. Matsumoto et al., "Detection Method of Malignant Tumors in DR Images—Iris Filter", Journal of the Institute of Electronics, Information and Communication Engineers, Vol. J-75-D11, No. 3, pp. 663-670, 1992 discloses a method of evaluating images based on distributions of gradient vectors. As alternatives to the aforementioned features, the features may be calculated, based on distributions of gradient vectors.

Each of the red eye classifiers 42-2 through 42-K detects red eyes, by comparing the calculated features against set threshold values (standard red eye detecting parameters). A judgment target region EP is detected as representing a red eye if all of the red eye classifiers 42-1 through 42-K judges that the judgment target region EP represents a red eye. On the other hand, if any one of the plurality of red eye classifiers 42-1 through 42-K judges that a judgment target region EP does not represent a red eye, the judgment target region EP is judged to not represent a red eye.

Note that the set threshold values (standard red eye detecting parameters) are obtained as a result of learning, employing sample images that represent red eyes and sample images that represent subjects other than red eye (all of which are of a 10×10 pixel size). Appropriate features, score tables, and threshold values are employed as a result of the learning process. The learning method is not particularly limited, and various known machine learning methods, such as the neural network method and the boosting method may be employed.

In the case that it is discriminated that a facial image F is of a person who is registered in the database 20, each of the red eye classifiers 42-1 through 42-K employ red eye detecting parameters PM1 which are correlated to the person and registered in the database 20, during red eye detection. In this manner, red eye detection is performed by set red eye detecting parameters PM1 which differ for each facial image F. Thereby, red eye detection that accommodates differences among individuals regarding the ease with which red eyes occur becomes possible, and the detection accuracy for red eyes can be improved.

For example, in the case that a person, for whom red eye occurs easily and who is registered in the database 20, is pictured within an entire image P, red eye detecting parameters PM1 having lower threshold values than the standard red eye detecting parameters are employed. Thereby, the detection rate of the red eye detecting means 40 is improved, and red eyes can be positively detected from within a facial image F in which red eye is likely to have occurred. On the other hand, in the case that a person, for whom red eye does not occur easily and who is registered in the database 20, is pictured within an entire image P, red eye detecting parameters PM1 having higher threshold values than the standard red eye detecting parameters are employed. Thereby, the false positive detection rate of the red eye detecting means 40 is decreased, and erroneous detection of red eyes from within a facial image F in which red eye is not likely to have occurred can be prevented. In this manner, the discrimination results for each facial image F, obtained by the discriminating means 30, are employed to set the red eye detecting parameters PM1 corresponding to the person pictured in each facial image F in the red eye classifiers 42-1 through 42-K. Thereby, the detection accuracy with respect to red eyes can be improved.

The red eye processing apparatus 1 of FIG. 1 further comprises a red eye correcting means 50, for correcting red eyes detected by the red eye detecting means 40. The red eye correcting means 50 functions to correct the color of pupils which have been photographed as red or gold, as illustrated in FIG. 10A, to natural colors of pupils, as illustrated in FIG. 10B. Red eye correcting parameters PM2 that determine the degree of correction (correction level) are correlated to specific people and registered in the database 20 (refer to FIG. 7). In addition, standard red eye correcting parameters PM3 are also registered in the database 20. The red eye correcting means 50 performs correction, employing the red eye correcting parameters PM2 or PM3.

Specifically, red eye correcting parameters PM2 that cause weak red eye correction to be administered are correlated to people registered within the database 20 for whom red eye does not occur easily. On the other hand, red eye correcting parameters PM2 that cause strong red eye correction to be administered are correlated to people registered within the database 20 for whom red eye occurs easily. The red eye correcting parameters PM2 are correlated to specific people in this manner, in order to prevent deterioration in image quality, which may occur when red eye correction is performed to a great degree during correction of red eyes in a facial image of a person for whom red eye does not occur easily.

FIG. 11 is a flow chart that illustrates the steps of a preferred embodiment of the red eye correcting process of the preset invention. This process will be described with reference to FIGS. 1 through 11. First, a facial image F, which is included in an entire image P, is detected by the face detecting means 10 (step ST1). Next, whether the detected facial image F is of a specific person who is registered in the database 20 is judged by the discriminating means 30 (step ST2). In the case that the detected facial image F is not of a person who is registered in the database 20, the red eye detecting means 40 performs red eye detection employing the standard red eye detecting parameters (step ST4). On the other hand, in the case that the detected facial image F is of a person who is registered in the database 20, the red eye detecting means 40 performs red eye detection employing the red eye correcting parameters PM1 correlated with the person (step ST5).

Thereafter, whether red eyes were detected by the red eye detecting means 40 is judged (step ST6). In the case that the judgment in step ST6 is affirmative, the red eye correcting means 50 performs red eye correction, employing the red eye correcting parameters PM2 or PM3, obtained from the database 20 (step ST7).

According to embodiment described above, whether a facial image F detected by the face detecting means 10 is of a specific person who is registered in a database is discriminated. If it is discriminated that the detected facial image F is that of the specific person, red eyes are detected from within the facial image F employing red eye detecting parameters PM1 which are correlated with the specific person. Therefore, red eye detection properties can be set for each facial image, to correspond to differences among people, for whom red eye occurs easily, and for whom red eye does not occur easily. Accordingly, the accuracy of red eye detection can be improved.

As illustrated in FIG. 8, the red eye detecting means 40 comprises: the region setting means 41, for setting discrimination target regions EP of a set number of pixels within the facial images F; and the plurality of red eye classifiers 42-1 through 42-K, for extracting features from the discrimination target regions EP, and for detecting red eyes by comparing the features against the red eye detecting parameters PM1 or the standard red eye detecting parameters. Red eyes are detected, by employing a plurality of discrimination results of the plurality of red eye classifiers 42-1 through 42-K. Thereby, red eyes can be accurately detected.

The red eye processing apparatus further comprises: the red eye correcting means 50, for correcting red eyes if red eyes are detected by the red eye detecting means 40. Red eye correcting parameters PM2 that determine the degree of correction by the red eye correcting means 40 are correlated with each of the specific people and registered in the database 20. If the discriminating means 30 discriminates that the detected facial image F is of a specific person who is registered in the database 20, the red eye correcting means 50 performs red eye correction with respect to the facial images F according to the contents of the red eye correcting parameters PM correlated with the specific person Thereby, deterioration in image quality, which may occur when red eye correction is performed to a great degree during correction of red eyes in a facial image of a person for whom red eye does not occur easily, that is, in the case that the possibility of false positive detection is high, can be prevented.

As illustrated in FIG. 2, the face detecting means 10 comprises: the partial image generating means 11, for generating a plurality of partial images PP by scanning the subwindow W, which is a frame surrounding a set number of pixels; and the face classifiers, for discriminating whether the partial images generated by the partial image generating means are faces. The face classifiers may perform final discrimination regarding whether the plurality of partial images represent faces, employing discrimination results of a plurality of weak classifiers $CF_1$ through $CF_m$. Thereby, faces can be detected accurately and efficiently.

The present invention is not limited to the embodiment described above. For example, a case has been described in which a single facial image F was detected from within the entire image P. However, the present invention may also be applied to a case in which a plurality of facial images F are detected. In this case, the discriminating means 30 discriminates whether each of the facial images F are of specific people who are registered in the database 20. If the facial images F are of specific people who are registered in the database 20, red eye detection and red eye correction are performed, employing the red eye detecting parameters PM1 and the red eye correcting parameters PM3 correlated with each person.

In the embodiment described above, people for whom red eye occurs easily and people for whom red eye does not occur easily are described as examples. Alternatively, red eye detecting parameters may be set, based on the characteristics of red eye for each person, such as the color of red eyes ad the positions at which they occur. For example, red eye detecting parameters that enable detection of red eyes when pixel values indicate a gold color may be set for people whose red eyes appear to approximate gold.

In FIG. 7, the red eye detecting parameters PM1 and the red eye correcting parameters PM2 are correlated with each person who is registered in the database 20. Alternatively, the parameters PM1 and PM2 may be correlated to people according to race, instead of different parameters PM1 and PM2 being correlated with each individual person.

Methods for setting the judgment target regions EP within the facial images F, as illustrated in FIG. 9, may also be recorded in the database 20 for each person registered therein. As a specific example of such a method, a plurality of facial images F having different resolutions may be generated, and judgment target regions EP may be set on each of the plurality of facial images F, for people for whom red eye occurs easily.

A case has been described in which red eye detection is performed with respect to facial images F of people for whom red eye does not occur easily. Alternatively, data indicating that red eye detection is not to be performed may be registered as the red eye detecting parameters PM1, and correlated with people for whom red eye does not occur easily.

Further, the detail during red eye detection by the red eye detecting means 40 may be varied for each person. The judgment target regions EP may be set at finer intervals for people for whom red eye occurs easily than for people for whom red eye does not occur easily. Specifically, when the judgment target regions EP are set as illustrated in FIG. 9, the 10×10 pixel regions may be scanned while skipping every other pixel in facial images F of people for whom red eye does not occur easily, whereas scanning may be performed without skipping any pixels in facial images F of people for whom red eye occurs easily. By setting the judgment target regions EP in this manner during red eye detection, false positive detections can be prevented when pixels are skipped, and missed detection can be prevented when pixels are not skipped.

The red eye processing apparatus described above may be incorporated into digital cameras or printers. In the case that the red eye processing apparatus is incorporated into a digital camera, the red eye processes may be administered during photography, or may be provided as an image correcting function for photographed images. The red eye processes may be semiautomatic, that is, they may be administered according to user input.

What is claimed is:

1. A red eye processing method used in a red eye processing apparatus having a computer, comprising:
    detecting a facial image from within an entire image;
    discriminating whether the detected facial image is of a specific person who is registered in a database using the computer in the processing apparatus; and
    detecting red eyes from within the facial image using the computer in the processing apparatus employing red eye detecting parameters which are correlated to the specific person and registered in the database, if it is discriminated that the detected facial image is that of the specific person.

2. The red eye processing method of claim 1, wherein the red eye detecting parameters are determined by at least detection rates and false positive detection rates during detection of red eyes, the detection rates being percentages of correct judgments of red eyes as being red eyes, and the false positive detection rates being percentages of false positive detections in which objects other than red eyes are judged to be red eyes.

3. The red eye processing method of claim 2, wherein the detection rates being percentages of correct judgments of red eyes as being red eyes, and the false positive detection rates being percentages of false positive detections in which objects other than red eyes are judged to be red eyes.

4. A red eye processing apparatus, comprising:
    face detecting means, for detecting a facial image from within an entire image;
    a database, in which specific people and red eye detecting parameters that determine detection properties during detection of red eyes from eyes of each of the specific people are correlated and registered;
    discriminating means, for discriminating whether the detected facial image is of a specific person who is registered in the database; and
    red eye detecting means, for detecting red eyes from within the facial image employing the red eye detecting parameters which are correlated to the specific person and registered in the database, if it is discriminated that the detected facial image is that of the specific person.

5. A red eye processing apparatus as defined in claim 4, wherein the red eye detecting means comprises:
    region setting means, for setting discrimination target regions of a set number of pixels within the facial image; and
    a plurality of red eye classifiers, for extracting features from the discrimination target regions set by the region setting means, and for detecting red eyes by comparing the features against the red eye detecting parameters; and
    wherein:
    red eyes are detected, by employing a plurality of discrimination results of the plurality of red eye classifiers.

6. A red eye processing apparatus as defined in claim 4, further comprising:
    red eye correcting means, for correcting red eyes if red eyes are detected by the red eye detecting means; and
    wherein:
    red eye correcting parameters that determine the degree of correction by the red eye correcting means are correlated with each of the specific people and registered in the database; and
    the red eye correcting means performs red eye correction with respect to the facial image according to the contents of the red eye correcting parameters correlated with a specific person, if it is discriminated that the detected facial image is that of the specific person.

7. A red eye processing apparatus as defined in claim 4, wherein the face detecting means comprises:
    partial image generating means, for generating a plurality of partial images by scanning a subwindow, which is a frame surrounding a set number of pixels; and
    face classifiers, for discriminating whether the partial images generated by the partial image generating means are faces; and
    wherein:
    the face classifiers perform final discrimination regarding whether the plurality of partial images represent faces, employing discrimination results of a plurality of weak classifiers.

8. The red eye processing apparatus of claim 4, wherein the red eye detecting parameters are determined by at least detection rates and false positive detection rates during detection of red eyes, the detection rates being percentages of correct judgments of red eyes as being red eyes, and the false positive detection rates being percentages of false positive detections in which objects other than red eyes are judged to be red eyes.

9. The red eye processing method of claim 8, wherein the detection rates being percentages of correct judgments of red eyes as being red eyes, and the false positive detection rates being percentages of false positive detections in which objects other than red eyes are judged to be red eyes.

10. A non-transitory computer-readable medium in which a red eye processing program is stored, said program causes a computer to execute the procedures of:
    detecting a facial image from within an entire image;
    discriminating whether the detected facial image is of a specific person who is registered in a database; and
    detecting red eyes from within the facial image employing red eye detecting parameters which are correlated to the specific person and registered in the database, if it is discriminated that the detected facial image is that of the specific person.

11. The non-transitory computer-readable medium in which a red eye processing program is stored as recited in claim 10, wherein the red eye detecting parameters are determined by at least detection rates and false positive detection rates during detection of red eyes, the detection rates being percentages of correct judgments of red eyes as being red eyes, and the false positive detection rates being percentages of false positive detections in which objects other than red eyes are judged to be red eyes.

12. The red eye processing method of claim 11, wherein the detection rates being percentages of correct judgments of red eyes as being red eyes, and the false positive detection rates being percentages of false positive detections in which objects other than red eyes are judged to be red eyes.

* * * * *